US006859727B2

(12) United States Patent
Bye et al.

(10) Patent No.: US 6,859,727 B2
(45) Date of Patent: Feb. 22, 2005

(54) ATTITUDE CHANGE KALMAN FILTER MEASUREMENT APPARATUS AND METHOD

(75) Inventors: Charles T. Bye, Eden Prairie, MN (US); Christopher A. Lund, Otsego, MN (US); Lawrence C. Vallot, Shoreview, MN (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 10/338,415

(22) Filed: Jan. 8, 2003

(65) Prior Publication Data

US 2004/0133346 A1 Jul. 8, 2004

(51) Int. Cl.$^7$ .............................................. G01C 21/32
(52) U.S. Cl. ........................ 701/210; 701/200; 701/220
(58) Field of Search ............................... 701/208, 209, 701/210, 213, 214, 220, 221, 222; 342/357.02, 357.14, 357.11, 394, 442

(56) References Cited

U.S. PATENT DOCUMENTS

| 5,527,003 | A | * | 6/1996 | Diesel et al. ............... 244/195 |
| 5,574,650 | A | * | 11/1996 | Diesel ......................... 701/220 |
| 5,615,116 | A | | 3/1997 | Gudat et al. |
| 5,657,025 | A | * | 8/1997 | Ebner et al. ................. 701/300 |
| 6,272,432 | B1 | * | 8/2001 | Li et al. ...................... 701/222 |
| 6,415,223 | B1 | | 7/2002 | Lin et al. |

FOREIGN PATENT DOCUMENTS

EP         1 059 509 A1    12/2000

OTHER PUBLICATIONS

R.E. Kalman, "A New Approach to Linear Filtering and Prediction Problems", Transactions of the ASME–Journal of Basic Engineering, 82 (Series D): 35–45. Copyright© 1960 by ASME.

Greg Welch et al., "An Introduction to the Kalman Filter", UNC–Chapel Hill, TR 95–041, Mar. 11, 2002.

Peter S. Maybeck, "Stochastic Models, Estimation, and Control", vol. 1, 1979.

* cited by examiner

Primary Examiner—Richard M. Camby
(74) Attorney, Agent, or Firm—Schiff Hardin LLP

(57) ABSTRACT

A navigation system includes a Kalman filter to compensate for bias errors in inertial sensing elements. An observed pitch, roll or heading change is input to the Kalman filter either from an aiding source or when the navigation system is in a known condition. The Kalman filter generates a correction signal that is provided to the navigation computation system.

15 Claims, 2 Drawing Sheets

ATTITUDE CHANGE KALMAN FILTER MEASUREMENT APPARATUS AND METHOD

BACKGROUND OF THE INVENTION

1. Field of the Invention

The present invention relates generally to a method and apparatus for correction of bias errors in a navigation system, and in particular to correction of bias errors in an inertial navigation system through the use of change in attitude measurements processed by a Kalman Filter.

2. Description of the Related Art

Inertial navigation is based on systems first built using gyros and accelerometers located on a moving platform or gimbal, which required very complicated technical and power consuming constructions that were prone to failure. Later on, solid state solutions have been realized by using only discrete integrated electromechanical or electro-optical sensors attached directly to the vehicle or strapdown. These solid state systems have minimal moving parts, and consist of laser-gyros, mechanical accelerometers and/or integrated gyros and accelerometers manufactured using MEMS (Micro Electro-Mechanical System) technology.

Inertial navigation systems (INS) are used in a wide variety of applications, including civil and military aviation, cruise missiles, submarines and space technology. According to these areas of operation, the entire system and all components have to be very precise and reliable. As a consequence, the costs for such a system are still relatively high and the size is not yet so small that it can be used for mobile roboting, wearable computing, automotive or consumer electronics.

But navigation systems designed for these mobile applications require a very small and inexpensive implementation of such an INS. Industrial demand for low-cost sensors (in car airbag systems, for example) and recent progress in MEMS integration technology have led to sophisticated sensor products, which are now both small (single chips) and inexpensive.

A body's actual spatial behavior/movement can be described with six parameters: three translatory (x-, y-, z-acceleration) and three rotatory components (x-, y-, z-angular velocity). To be able to define the movement of the body, three acceleration sensors and three gyros have to be put together on a platform in such a way that they form an orthogonal system either physically or mathematically. The distance translated and the angle the body has actually rotated can be obtained by integration of the individual translatory and rotatory components. Performing these calculations accurately and periodically enables the INS to trace its movement and to indicate its current position, velocity, pitch, roll, and heading.

The main limitation of the system performance is due to the finite precision or accuracy of the sensors. For example, a continuous small error in acceleration will be integrated and results in a significant error in measured or predicted velocity. The velocity is then integrated a second time and will result in a position error. Therefore very precise sensors and error correction mechanisms are necessary for an accurate inertial navigation platform.

A paper published by R. E. Kalman in 1960, "A New Approach to Linear Filtering and Prediction Problems", Transactions of the ASME-Journal of Basic Engineering, 82(Series K): pages 35–45(1960) described a recursive solution to the discrete-data linear filtering problem. The Kalman filter is a set of mathematical equations to provide a computational solution of the least-square method.

In his book, "Stochastic Models, Estimation, and Control" vol. 1, Chapter 1, pages 1–16 (1979), Peter S. Maybeck discusses the Kalman filter as an optimal linear estimator.

Greg Welch et al. review use of the Kalman filter in the area of autonomous or assisted navigation in the paper, "An Introduction to the Kalman Filter", UNC-Chapel Hill, TR 95-041, Mar. 11, 2002.

SUMMARY OF THE INVENTION

The present invention provides an application of a Kalman filter to determine and remove gyro bias errors from an inertial navigation system. This implementation adds an attitude change measurement to the Kalman filter. This change may be made in the heading measurement and/or the level attitudes (pitch and roll), and provides the observability needed to estimate the gyro biases in the inertial system. For example, when the system is stationary it is undergoing zero change in heading, pitch, and roll relative to the earth. This contrasts with the conventional approach of using a known pitch, roll, and heading as the measurement for the Kalman filter.

To improve the performance of the inertial sensors, a Kalman filter is employed to estimate the inertial sensors errors using measurements from a variety of sources. Measurements are processed in the Kalman filter. For example, the fact that the INS (inertial navigation system) is stationary (at a known position and heading, and zero velocity), information from a Global Positioning System (GPS), or information from another INS can be a measurement. The processing by the Kalman filter algorithm results in an estimate of the sensor errors (e.g. bias, scale-factor, non-linearity) which is used to correct the errors.

DETAILED DESCRIPTION OF THE PREFERRED EMBODIMENTS

Figure 1:
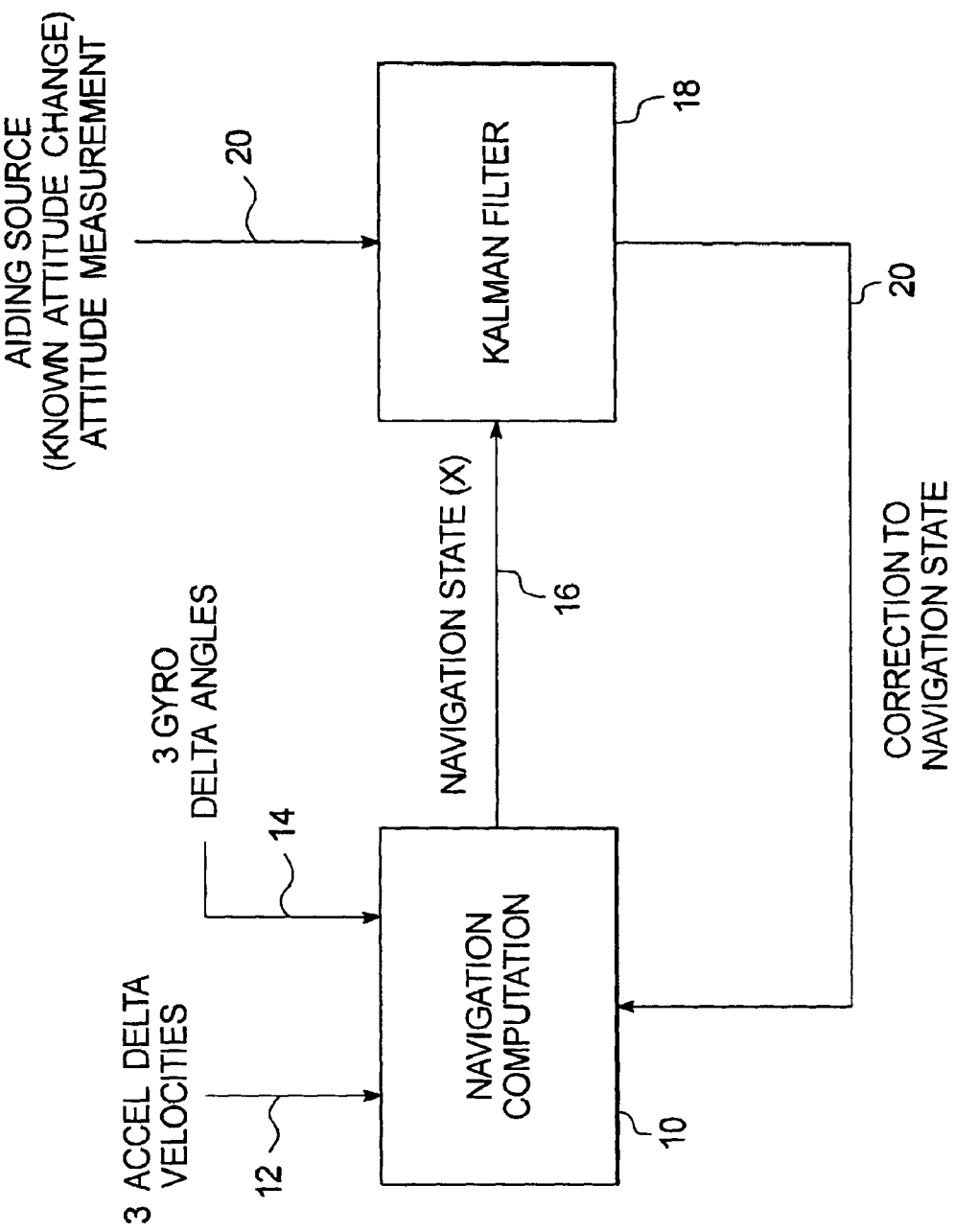
FIG. 1 is a block diagram of the basic structure of the present system.

FIG. 1 is a block diagram showing a navigation system 10, such as may be used in a vehicle or other moving body, which receives as inputs three signals from accelerometers 12 and three signals from gyros 14. The navigation system performs a strapdown navigation reference computation and provides as an output a navigation state signal (x) on 16. This navigation state signal is provided to a Kalman filter 18. In some applications, an aiding source 20 is connected to the Kalman filter 18 is to provide a change in attitude measurement. In other applications, the aiding source is the act of performing the measurements while the body is stationary. The Kalman filter 18 generates a signal on 20 that is returned to the navigation system 10, to thereby correct the bias errors which would otherwise cause significant errors in the navigation system's estimate of the vehicle's (or body's) movement.

Figure 2:
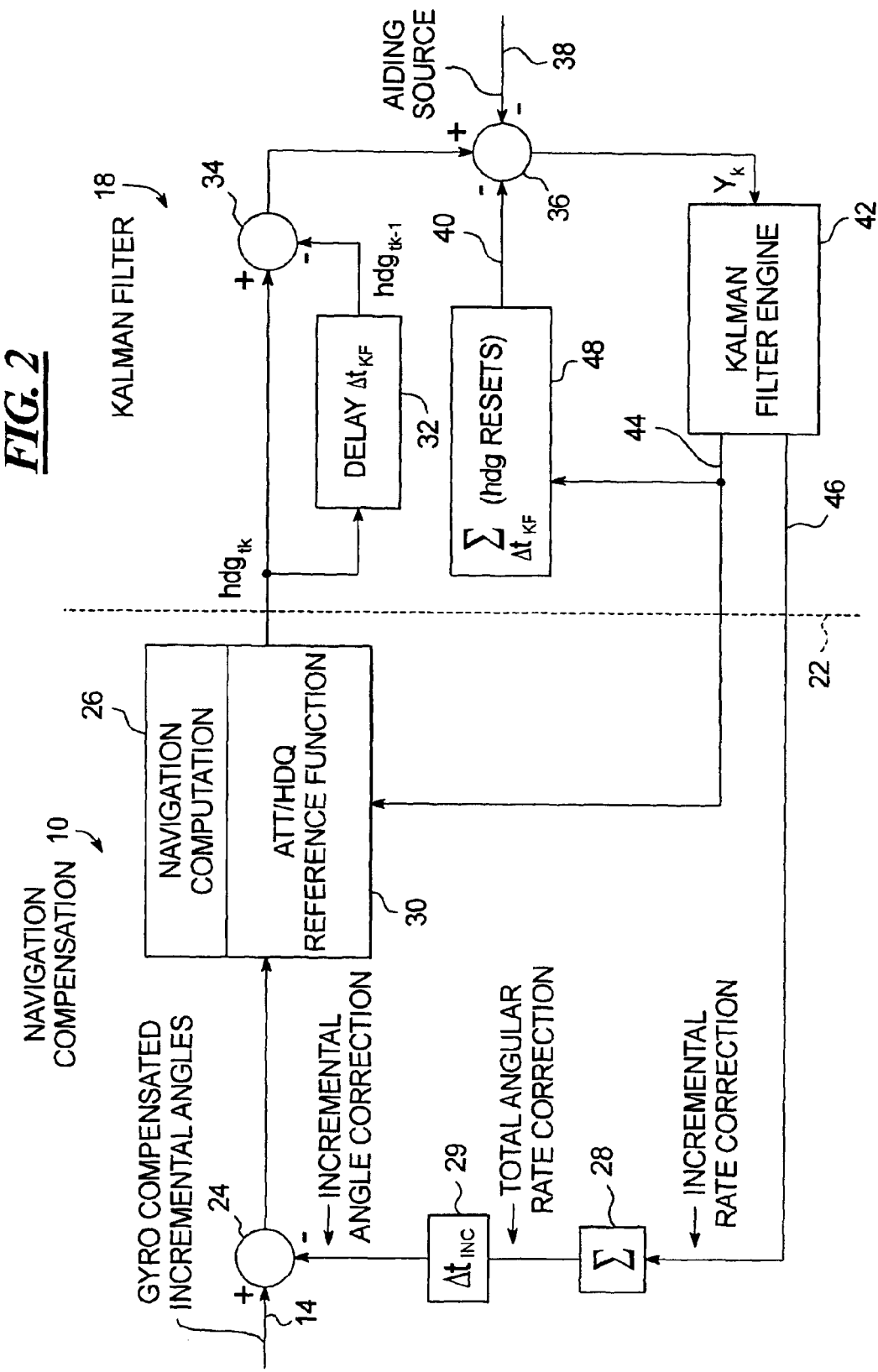
FIG. 2 is functional block diagram showing the navigation system with the Kalman filter in greater detail.

FIG. 2 provides further detail of the present invention. Relevant additional details of the navigation portion 10 and of the Kalman filter portion 18 from FIG. 1 are shown separated by a broken line 22. The navigation portion 10 has the input 14 for the gyro compensated incremental angles which is provided to an adder 24, that is in turn connected to a navigation computation portion 26 where the compensation is computed using information from a factory calibration or previous usages of the INS. The adder 24 also receives an input from a multiplier unit 29. The multiplier unit 28 scale the accumulated total bias rate correction from the summing unit 28 to incremental rates. The input to the multiplier unit 29 is a summing unit 28, which represents the Kalman filter's accumulated estimate of the gyro bias. The output of the adder 28 are provided to an attitude and heading reference function unit 30 in the navigation computation portion 26. The attitutude and heading reference function unit 30 produces a signal hdg($t_k$) that is forwarded to the Kalman filter portion 18.

The detail for the Kalman filter operation shown in FIG. 2 shows only the heading error correction. The preferred embodiment of the invention has similar signal paths for pitch and roll correction which are the same, but these are omitted for clarity. In the Kalman filter function, the signal hdg($t_k$) is sent to two sub-functions. The first sub-function is a delay unit 32 to delay by a factor of $\Delta t_{(kf)}$ to generate a signal hdg($t_{(k-1)}$). The two signals hdg($t_k$) and hdg($t_{(k-1)}$) are forwarded to an adder 34, with the signal hdg($t_k$) being fed to the adding input of the adder 34 and the signal hdg($t_{(k-1)}$) being fed to the subtracting input of the adder 34. The output of the adder is fed to the adding input of a further adder 36. This further adder 36 also has an input 38 connected to receive the observed heading change relative to an Earth over the time $\Delta T_{KF}$. In the case where the INS is at rest (stationary) this measurement is zero. The further adder has another subtracting input 40 which will be discussed later.

The output of the further adder 36 is provided to the Kalman filter engine 42 as a signal $y_k$. The Kalman filter operation will be discussed in detail hereinafter. The two outputs 44 and 46 of the Kalman filter engine 42 are an attitude (pitch and roll) and heading reset signal on 44 and a gyro bias reset rate signal on 46. The attitude and heading reset signal 44 is input to the attitude and heading function 30 and to an attitude and heading reset summer 48. The gyro bias rate resets signal 46 goes to the integrator 28. The integrator 28 integrates the gyro bias rate resets signal 46 over the time $\Delta T_{KF}$, the time period of the delay unit 32. The integrated output of the integrator 48 is fed to the subtracting input 40 of the further adder 36.

In detail, the Kalman filter state vector $\underline{x}$ is defined, $$\underline{x}=[\Psi_x^n \Psi_y^n \Psi_z^n \delta\omega_x^s \delta\omega_y^s \delta\omega_z^s]^T$$

where:

$\underline{\Psi}^n$=the 3-dimensional vector (or 3-vector) representing the errors in the computed sensor-to-navigation frame tranformation matrix $C_s^n$, $\delta\underline{\omega}^s$=3-vector representing the angular drift rate errors (or biases) of the three gyros in the sensor frame.

Typically, in most attitude reference and inertial navigation applications, the filter state vector is larger due to inclusion of other elements, but the six-element vector shown here suffices to describe the present invention.

The continuous time dynamical model is $$\underline{\dot\Psi}^n=-(\underline{\Omega}^n+\underline{\rho}^n)\times\underline{\Psi}^n-C_s^n\delta\underline{\omega}^s+\underline{\eta}_{ARW},$$

$$\delta\underline{\dot\omega}^s=\underline{\eta}_{\delta\omega}$$

where:

$\underline{\Omega}^n$=the earth spin rate vector in the navigation frame, $\underline{\rho}^n$=the transport rate vector in the navigation frame, $C_s^n$=3×3 direction cosine matrix defining the transformation of a vector from the sensor frame to the navigation frame, $\underline{\eta}_{\delta\omega}$=a three vector white noise process causing a random walk in the gyro drift error vector $\delta\underline{\omega}^s$, and $\underline{\eta}_{ARW}$=a three vector white noise process causing an "angle random walk" attitude/heading error growth.

This can be written in partitioned form as $$\begin{bmatrix}\underline{\dot\Psi}^n \\ \delta\underline{\dot\omega}^s\end{bmatrix}=\begin{bmatrix}-\{\Omega^n+\rho^n\} & -C_s^n \\ 0 & 0\end{bmatrix}\begin{bmatrix}\underline{\Psi}^n \\ \delta\underline{\omega}^s\end{bmatrix}+\begin{bmatrix}\underline{\eta}_{ARW} \\ \underline{\eta}_{\delta\omega}\end{bmatrix}$$

or in more compact form as $$\underline{\dot x}=F\underline{x}+\underline{\eta}$$

where (in this example) F is a 6×6 matrix and the $\underline{x}$ and $\underline{\eta}$ vectors are a 6×1 matrix. Note that the matrix $$\begin{bmatrix}-\{\Omega^n+\rho^n\} & -C_s^n \\ 0 & 0\end{bmatrix}$$

depicts a 6×6 matrix, where each quadrant is a 3×3 matrix. That is, "0" represents a 3 by 3 matrix containing all zeroes, and the notation $\{\Omega+\rho\}$ defines a 3×3 matrix $$\begin{bmatrix}0 & -\Omega_z-\rho_z & \Omega_y+\rho_y \\ \Omega_z+\rho_z & 0 & -\Omega_x-\rho_x \\ -\Omega_y-\rho_y & \Omega_x+\rho_x & 0\end{bmatrix}$$

The usual representation of the model is in discrete time:

$$x_{k+1}=\Phi x_k+w_k$$

where $\Phi$ is normally approximated by a series expansion in F, such as the second order approximation:

$$\Phi=I+F\Delta t+(F\Delta t)^2/2$$

The Kalman filter state vector is propagated between measurements as $$\hat{x}_{k+1}=\Phi\hat{x}_k;\ \hat{x}(0)=0$$

The error covariance propagation is $$P_{k+1}=\Phi P_k\Phi^T+Q_k;\ P(0)=P_0$$

where $Q_k=E[W_k W_k^T]$, $P_k$ is the covariance matrix of the error in the estimate $\hat{x}_k$ and $P_0$ represents the initial uncertainty in the state vector elements.

An attitude or heading change measurement update is made wherein the Kalman filter's measurement is the difference between, on one hand, the inertially computed attitude or heading change of the KF update interval $\Delta t_{KF}$ (less any attitude or heading resets applied by the filter during the interval) and, on the other hand, the externally observed attitude or heading change over the $\Delta t_{KF}$ update interval.

For a non-rotating IMU, the externally observed attitude or heading change (at the aiding source) is taken to be zero. For a rotating IMU platform, the externally observed attitude or heading change would be determined using other sensors, such as a compass INS, or magnetometer, a star tracker, etc. and provided to the input 38 as shown in FIG. 2.

The following paragraph describes only the heading change measurement. The attitude change measurement is identical except that is uses pitch or roll rather than heading and uses the pitch or roll components of the attitude matrix (C) and the state vector. The change in heading measurement is $y_k$=[(inertial heading at $t_k$-inertial heading at $t_{k-1}$-sum of all headings resets applied by the filter during the $\Delta t_{KF}$ interval)]-[observed heading at $t_k$-observed heading at $t_{k-1}$]

The KF measurement model is $y_k = H_k \underline{x}_k + v_k,$ where $H_k$ is the 1×6 measurement sensitivity matrix $H_k = [(\Omega_y{}^n + \rho_y{}^n), -(\Omega_x{}^n = \rho_x{}^n), 0, -C + ee{}_s{}^n(3,1), -+e, \text{ovs } C_s{}^n(3,2), -C_s{}^n(3,3)] \cdot \Delta t_{KF}$ where $\overline{C_s{}^n}(i, j)$ is the average of the i,j element of $C_s{}^n$ over the measurement $\Delta t_{KF}$ interval, and $v_k$ represents the noise in the heading change difference measurement, with $E\{v_k{}^2\} = R_k$ The filter's measurement update of the state vector and the covariance matrix proceed in the usual fashion. One implementation being $K_k = P_k H_k{}^T [H_k P_k H_k{}^T + R_k]^{-1}$ $\hat{x}_{k+} = \hat{x}_{k-} + K_k(Y_k - H_k \hat{x}_{k-})$ $P_{k+} = (I - K_k H_k) P_{k-}$ There are many well known alternative methods in the published literature defining alternative implementations of the Kalman gain and covariance update calculations, all of which can be used in lieu of the above form, and are within the scope of the present invention.

The post measurement update state vector $\hat{x}_{k+}$ can be used to reset the attitude and heading direction cosine matrix $C_s{}^n$ and the gyro drift compensation parameters.

One example of the the software implementation of the change in heading measurement to the Kalman filter is, as follows:

The Kalman filter is modified to include a change in heading measurement. Once again only the change in heading measurement is shown for simplicity. A similar implementation is used for the level attitudes. The detailed software implementation is as follows for a heading change measurement:

```
// Heading change measurement
// Zero heading change measurement should only be enabled
   when the
// platform is stationary.
/
if (first_pass)
{first_pass = false;
}
else
{filter.kalman.measurement_form[ATT[2]] =
   KF_UD_UTLLITIES::CONVENTIONAL;
   heading_change error = ANGLE_MATH::Plus_or_Minus_Pi
      (previous_heading_after_reset -
      passed_true_heading_prior_to_reset);
   delta_time = filter.time - previous_time;
   if (    (delta_time < filter.delta_time *2)
      &&   (filter.desired_mode = SMALL_AZIMUTH))
   {earth_plus_transport_rate =
   filter.average.transport_rate_LV
      + filter.average.earth_rate_LV;
   filter.kalman.Y.vector[ATT[2]] =
   heading_change_error.angle;
   filter.kalman.R.vector[ATT[2]] =
      filter.measurement_noise_stdv.ATT *
      filter.measurement noise stdv.ATT;
   filter.kalman.H.matrix[ATT[2]][PSIX] =
      -earth_plus_transport rate.vector[1] * delta_time;
   filter.kalman.H.matrix[ATT[2]][PSIY] =
      -earth_plus_transport rate.vector[0] * delta_time;
   filter.kalman.H.matrix[ATT[[2]][GBIASX] =
      -filter.average.body_to_lv_dcm.matrix[2][0] * delta_time;
   filter.kalman.H.matrix[ATT[2]][GBIASY] =
      -filter.average.body_to_lv_dcm.matrix[2][1] * delta_time;
   filter.kalman.H.matrix[ATT[2]][GBIASZ] =
      -filter.average.body_to_lv_dcm.matrix[2][2] * delta_time;
   filter.kalman.measurement_available.vector[ATT[2]] = true;
   //
   // Increment and measurement validity data.
   //
   filter.measurement_validity.number_available =
      filter.measurement_validity.number_available + 1;
   filter.measurement_validity.valid_id.
      vector[filter.measurement_validity.number_valid] =
      ATT[2]; filter.measurement_validity.number_valid =
      filter.measurement_validity.number_valid + 1;
   }
}
```

The present invention permits the inertial system to estimate bias errors, thereby permitting the use of poorer performing gyros, which cost less, yet achieve the performance of a INS containing better performing gyros.

The present system can be used on a wide variety of vehicles. For example, robotic vehicles may benefit from the present system. The present system may also be used on missiles, rockets and other guided bodies. The present system augments the performance of a INS that relies on GPS (Global Positioning Satellite) systems, which are subject to being blocked by obstructions and which may be jammed whether or not the GPS is configured to provide attitude information.

Although other modifications and changes may be suggested by those skilled in the art, it is the intention of the inventors to embody within the patent warranted hereon all changes and modifications as reasonably and properly come within the scope of their contribution to the art.

We claim:

1. An apparatus for correction of bias errors in a navigation system, comprising:
   a Kalman filter connected to the navigation system to receive attitude and heading signals from the navigation system, said Kalman filter including:
   a delay element connected to receive the heading signal and produce therefrom a delayed heading signal over an update interval,
   a signal combining element operable to subtract the delayed heading signal from the heading signal and produce an inertial heading change signal;
   a Kalman filter engine connected to receive said inertial attitude and heading change signals, said Kalman filter engine having an output connected to send a navigation correction signal to the navigation system.

2. A navigation system for a body, comprising:
   inertial sensors having outputs from which signals are provided corresponding to inertial changes in the body;

a navigation computation portion connected to receive the signals from said inertial sensors and producing a navigation signal; and a Kalman filter portion connected to receive the navigation signal, said Kalman filter being operable to respond to a measured condition of the body and from said measured condition generate a correction signal for input to said navigation computation portion, said measured condition of the body being a change in at least one of heading and attitude of the body.

3. A navigation system for a body, comprising:

inertial sensors having outputs from which signals are provided corresponding to inertial changes in the body;

a navigation computation portion connected to receive the signals from said inertial sensors and producing a navigation signal;

a Kalman filter portion connected to receive the navigation signal, said Kalman filter being operable to respond to a condition of the body and from said condition generate a correction signal for input to said navigation computation portion;

a summing unit receiving said correction signal from said Kalman filter and producing a summed signal at an output; and a signal combining unit having a subtracting unit connected to receive said summed signal at a subtracting input and to receive the signals from said inertial sensors at an adding input, said signal combining unit having an output connected to said navigation computation portion.

4. A navigation system for a body, comprising:

inertial sensors having outputs from which signals are provided corresponding to inertial changes in the body;

a navigation computation portion connected to receive the signals from said inertial sensors and producing a navigation signal;

a Kalman filter portion connected to receive the navigation signal, said Kalman filter being operable to respond to a condition of the body and from said condition generate a correction signal for input to said navigation computation portion; wherein said Kalman filter includes:

a delay element connected to receive the heading signal and produce therefrom a delayed heading signal over an update interval, a signal combining element operable to subtract the delayed heading signal from the heading signal and produce an inertial heading change signal;

a Kalman filter engine connected to receive said inertial heading change signal, said Kalman filter engine having an output connected to send a navigation correction signal to the navigation system.

5. A navigation system as claimed in claim 4, further comprising:

a summing unit in said Kalman filter portion having an input connected to an output of said Kalman filter engine, said summing unit being operable to sum heading resets over the update interval, said summing unit having an output which is connected so as to be subtracted from said inertial heading change signal.

6. A navigation system as claimed in claim 4, further comprising:

an input for an aiding device, said input receiving an observed heading change signal.

7. A navigation system as claimed in claim 6, wherein said observed heading change signal is from a heading change sensor.

8. A navigation system as claimed in claim 6, wherein said observed heading change signal taken while the body is stationary and the heading change signal is zero.

9. A method for correction of bias errors in a navigation system of a body, comprising the steps of:

receiving inertial sensor signals from inertia sensors mounted on said body;

computing navigation information to generate a heading signal;

applying a time delay corresponding to an update interval to said heading signal;

subtracting said time delayed heading signal from said heading signal to produce an inertial heading change over said update interval;

performing a Kalman filtering on said inertial heading change over said update interval to produce heading resets;

summing all heading resets over the update interval to produce a summed resets signal;

subtracting said summed resets signal from said inertial heading change over said update interval;

applying said heading resets to said computing navigation information step;

summing said resets signal to produce a bias correction parameter signal; and subtracting said bias correction parameter signal from said inertial sensor signals.

10. A method as claimed in claim 9, further comprising the step of:

performing said steps of claim 9 while the body is stationary.

11. A method as claimed in claim 9, further comprising:

subtracting an observed heading change signal from said inertial heading change signal before said step of performing said Kalman filtering step.

12. A method as claimed in claim 11, wherein said observed heading change signal is received from an aiding source.

13. A method as claimed in claim 12, wherein said aiding source is a master inertial navigation system.

14. A method as claimed in claim 11, wherein said observed heading change is zero while the body is stationary.

15. An apparatus for correction of gyro bias errors in a navigation system, comprising:

a filter connected to receive signals from the navigation system, said filter using change in attitude or heading information to generate a correction signal; and an output of said filter connected to said navigation system to provide said correction signal for correction of gyro bias errors.

* * * * *

UNITED STATES PATENT AND TRADEMARK OFFICE
CERTIFICATE OF CORRECTION

PATENT NO.     : 6,859,727 B2
DATED          : February 22, 2005
INVENTOR(S)    : Charles T. Bye et al.

It is certified that error appears in the above-identified patent and that said Letters Patent is hereby corrected as shown below:

Column 3,
Line 61, change "$\underline{\Omega^n} =$" to -- $\underline{\Psi^n} =$ --.
Line 62, change "$\underline{\delta + e.dot\ \omega}^s + ee$" to -- $\delta\omega^s$ --.
Line 67, change "$\underline{\rho^{11}}$" to -- $\underline{\rho^n}$ --.

Column 4,
After line 15, delete the line therewith, and insert -- $\underline{\dot{x}} = F\underline{x} + \underline{\eta}$ --.

Delete line 45, and insert -- $\hat{x}_{k+1} = \Phi\hat{x}_k \ ; \ \hat{x}(0) = 0$ --.

Column 5,
After line 15, delete the line therewith and insert the following

-- $H_k = \left[\left(\Omega_y^n + \rho_y^n\right), -\left(\Omega_x^n + \rho_x^n\right), 0, -\overline{C}_s^n(3,1), -\overline{C}_s^n(3,2), -\overline{C}_s^n(3,3)\right] \cdot \Delta t_{KF}$ --.

Delete line 20, and insert

--where $\overline{C}_s^n(i,j)$ is the average of the i,j element--.

After line 30, delete the three lines therewith and insert

-- $K_k = P_k H_k^T [H_k P_k H_k^T + R_k]^{-1}$
$\hat{x}_{k+} = \hat{x}_{k-} + K_k(Y_k - H_k \hat{x}_{k-})$
$P_{k+} = (I - K_k H_k) P_{k-}$ --.

UNITED STATES PATENT AND TRADEMARK OFFICE
CERTIFICATE OF CORRECTION

PATENT NO. : 6,859,727 B2
DATED : February 22, 2005
INVENTOR(S) : Charles T. Bye et al.

It is certified that error appears in the above-identified patent and that said Letters Patent is hereby corrected as shown below:

<u>Column 6,</u>
Line 5, change "SMALL AZIMUTH" to -- SMALL_AZIMUTH --.

Signed and Sealed this

Twenty-fifth Day of October, 2005

JON W. DUDAS
*Director of the United States Patent and Trademark Office*